(12) United States Patent
Klima et al.

(10) Patent No.: US 7,654,562 B2
(45) Date of Patent: Feb. 2, 2010

(54) LATERAL AIRBAG DEVICE

(75) Inventors: Josef Klima, Ulm (DE); Thomas Sievers, Ulm (DE)

(73) Assignee: Takata-Petri AG, Aschaffenburg (DE)

( * ) Notice: Subject to any disclaimer, the term of this patent is extended or adjusted under 35 U.S.C. 154(b) by 123 days.

(21) Appl. No.: 11/705,107

(22) Filed: Feb. 12, 2007

(65) Prior Publication Data
US 2007/0138774 A1 Jun. 21, 2007

Related U.S. Application Data

(63) Continuation of application No. PCT/DE2005/001432, filed on Aug. 10, 2005.

(30) Foreign Application Priority Data

Aug. 13, 2004 (DE) .................. 10 2004 040 236

(51) Int. Cl.
*B60R 21/207* (2006.01)
*B60R 21/233* (2006.01)

(52) U.S. Cl. .................... 280/730.2; 280/729

(58) Field of Classification Search .......... 280/729, 280/730.2, 743.1; *B60R 21/207, 21/231, B60R 21/233*
See application file for complete search history.

(56) References Cited

U.S. PATENT DOCUMENTS 3,814,458 A * 6/1974 Acs ........................ 280/729
3,900,210 A * 8/1975 Lohr et al. ................ 280/729
5,251,931 A * 10/1993 Semchena et al. ......... 280/730.1
5,498,030 A    3/1996 Hill et al.
5,556,128 A * 9/1996 Sinnhuber et al. ........ 280/730.2
5,556,129 A    9/1996 Coman et al.
5,630,616 A    5/1997 McPherson
5,803,485 A * 9/1998 Acker et al. .............. 280/728.2
5,860,673 A * 1/1999 Hasegawa et al. ......... 280/730.2
5,882,033 A * 3/1999 Lachat .................... 280/728.3
5,913,536 A    6/1999 Brown
6,113,135 A * 9/2000 Tsutsumi ................. 280/730.2
6,371,518 B1 * 4/2002 Kalandek et al. ......... 280/743.1

(Continued)

FOREIGN PATENT DOCUMENTS

| DE | 197 04 657 A1 | 8/1997 |
| DE | 199 50 702 A1 | 4/2001 |
| DE | 101 18 359 A1 | 10/2002 |
| DE | 203 18 978 U1 | 4/2004 |
| EP | 0 856 438 A2 | 6/1998 |
| EP | 1 010 591 A2 | 6/2000 |
| GB | 2 357 999 A | 7/2001 |

*Primary Examiner*—Paul N Dickson
*Assistant Examiner*—Laura Freedman
(74) *Attorney, Agent, or Firm*—Foley & Lardner LLP

(57) ABSTRACT

A lateral airbag device comprises a gas bag which is mounted in a vehicle seat below the seat covering of the vehicle seat. The gas bag is inflated in the event of an accident. The seat covering comprises at least one break line, which can be torn open when the gas bag unfolds enabling the gas bag to exit the vehicle seat. The lateral airbag device is capable of protecting the occupants of a vehicle in the event of an accident in a reliable manner. The seat covering is configured to bring the unfolding gas bag to a predetermined position or to maintain the unfolded gas bag in the predetermined positioned.

8 Claims, 4 Drawing Sheets

U.S. PATENT DOCUMENTS

| | | | |
|---|---|---|---|
| 6,517,109 B1 * | 2/2003 | Van Poppel | 280/743.1 |
| 6,536,799 B2 * | 3/2003 | Sinnhuber et al. | 280/735 |
| 6,715,788 B2 * | 4/2004 | Saiguchi et al. | 280/730.1 |
| 6,802,529 B2 * | 10/2004 | Takedomi et al. | 280/729 |
| 7,055,853 B2 * | 6/2006 | Honda et al. | 280/730.2 |
| 7,086,663 B2 * | 8/2006 | Honda | 280/730.2 |
| 2002/0047253 A1 * | 4/2002 | Rasch et al. | 280/728.2 |
| 2002/0063452 A1 | 5/2002 | Harada et al. | |
| 2003/0184061 A1 * | 10/2003 | Honda et al. | 280/730.2 |
| 2004/0232666 A1 * | 11/2004 | Sato et al. | 280/730.2 |

* cited by examiner

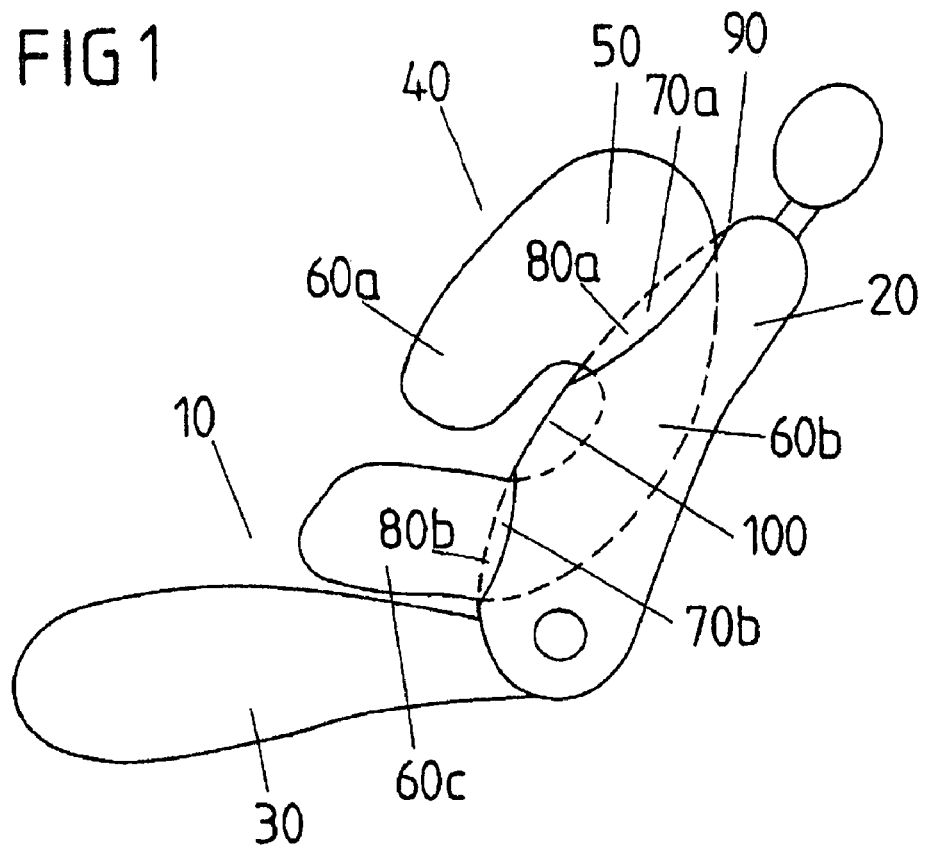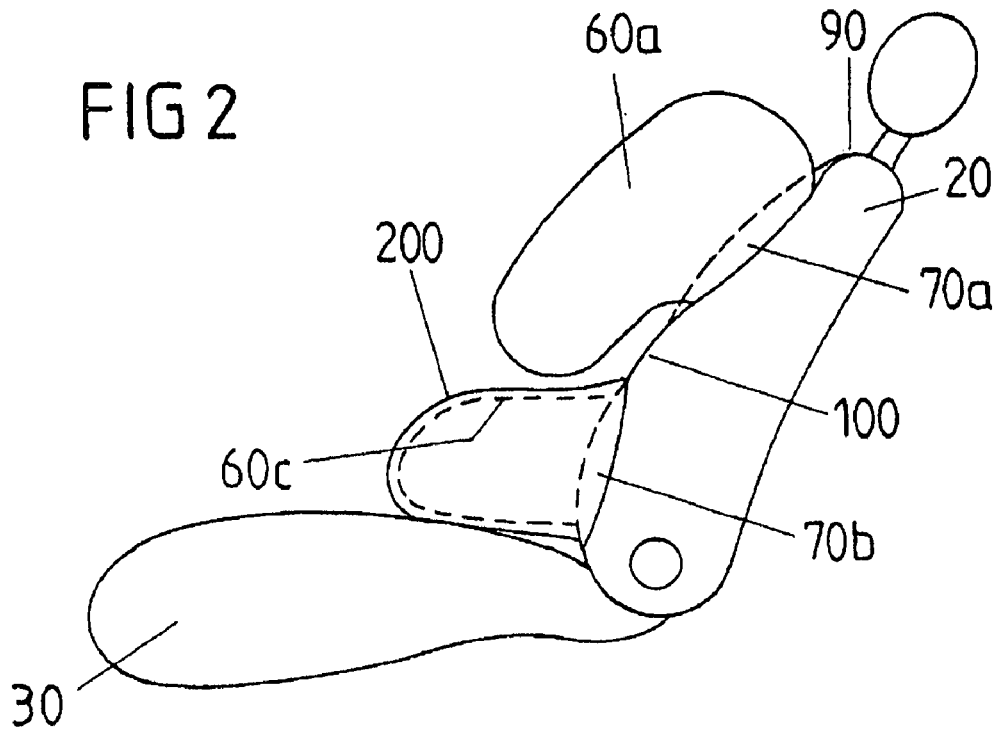

LATERAL AIRBAG DEVICE

CROSS-REFERENCE TO RELATED PATENT APPLICATIONS

This application is a continuation-in-part of International Application PCT/DE 2005/001432, which has an international filing date of Aug. 10, 2005; this International Application was not published in English, but was published in German as WO 2006/015591, all of which are incorporated by reference herein in their entirety.

BACKGROUND

The invention relates to a lateral airbag device.

A lateral airbag device of this type is known, for example, from U.S. Pat. No. 5,498,030 (which is incorporated by reference herein in its entirety). This previously known lateral airbag device has an airbag which is mounted in a flexible airbag covering in the interior of a vehicle seat, i.e. below the seat cover. In the event of an accident, the airbag is inflated, with the result that the flexible airbag covering breaks open at a tear seam provided for this purpose and releases the airbag. The seat cover of the vehicle seat subsequently tears open at a tear seam likewise provided for this purpose, so that the airbag can leave the interior of the seat and can deploy outside the vehicle seat. In the previously known lateral airbag device, the flexible airbag covering is provided with a "channel" or "slide" region which brings about a certain amount of guidance of the airbag during its inflation.

Furthermore, U.S. Pat. No. 5,630,616 (which is incorporated by reference herein in its entirety) describes a lateral airbag device with two separate airbags. One of the two airbags is arranged in the seat back region and protects the upper body region of the vehicle occupant. The other of the two airbags is arranged in the lower seat region of the vehicle seat and, after deployment, protects the lower body region of the vehicle occupant.

SUMMARY

One exemplary embodiment relates to a lateral airbag device. The lateral airbag device comprises an airbag mounted in a vehicle seat below a seat cover of the vehicle seat. The airbag is inflated in an event of a vehicle accident. The seat cover includes at least one tear seam which is torn open by the deploying airbag and permits the airbag to emerge from the vehicle seat. The deploying airbag deploys into a predetermined position by the configuration of the seat cover, or the seat cover maintains a predetermined position of the airbag.

Another exemplary embodiment provides a vehicle seat. The vehicle seat comprises a lateral airbag device that includes an airbag mounted in a vehicle seat below a seat cover of the vehicle seat. The airbag is inflated in an event of a vehicle accident. The seat cover includes at least one tear seam which is torn open by the deploying airbag and permits the airbag to emerge from the vehicle seat. The deploying airbag deploys into a predetermined position by the configuration of the seat cover, or the seat cover maintains a predetermined position of the airbag. According to another exemplary embodiment, a method for protecting a vehicle occupant is provided. The method comprises positioning an airbag in a vehicle seat such that the airbag is inflated in an event of an accident and tearing open at least one tear seam in a seat cover of the vehicle seat such that the airbag deploys through an opening from the opened tear seam. A position of the deploying or of the deployed airbag is determined by the seat cover.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 shows a first exemplary embodiment of a lateral airbag device and a vehicle seat; in this exemplary embodiment, the deployed airbag is held by a "non-tearing-open" seat cover section.

FIG. 2 shows a second exemplary embodiment of a vehicle seat and a lateral airbag device, in which a positioning of the airbag is brought about by a supporting bag which is fitted on the seat cover and into which at least some sections of the airbag deploy.

DETAILED DESCRIPTION

Figure 3:
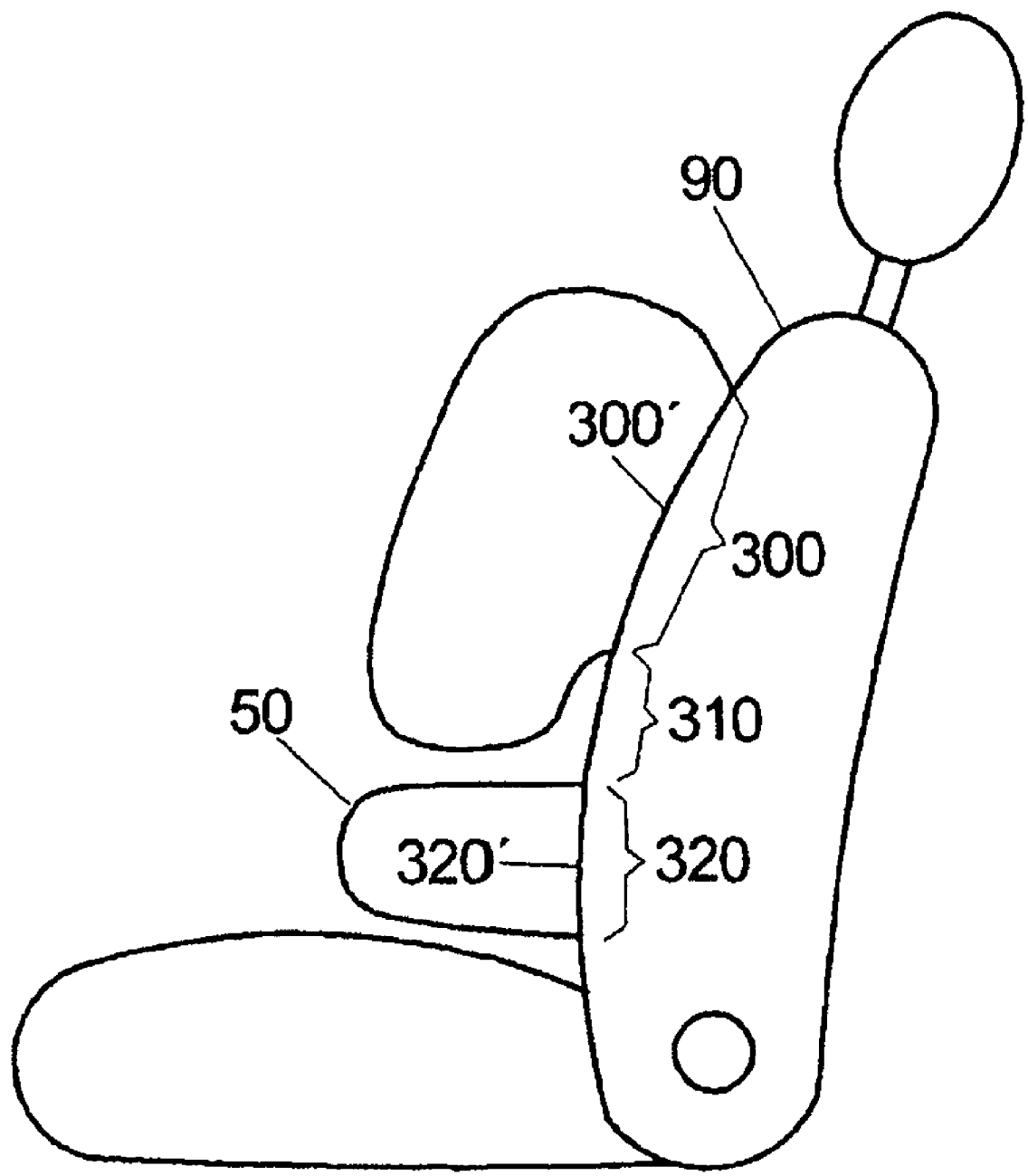
FIG. 3 show a third exemplary embodiment of a vehicle seat and of a lateral airbag device, in which a positioning of the airbag is brought about by tear seam sections tearing open at different times.

An object of embodiments is to provide a lateral airbag device which brings about particularly reliable protection of the vehicle occupant in the event of an accident.

According thereto, the embodiments make provision for the seat cover of the vehicle seat to be configured in such a manner that, during the inflation of the airbag, it helps the deploying airbag to come into a predetermined position, and/or, after inflation of the airbag, keeps the deployed airbag in the predetermined position, for example by "supporting" the airbag.

A substantial advantage of the lateral airbag device according to an embodiment can be seen in the fact that, with the latter, owing to the positioning action of the seat cover a consistently optimum position of the deployed airbag is achieved, so that the vehicle occupant is very well protected by the airbag in the event of an accident. Poor functioning of the restraining action of the airbag due to an unintended or unforeseeable position of the airbag is therefore avoided or at least substantially reduced.

A further substantial advantage of the lateral airbag device according to an embodiment is that, with the latter, even very large airbags can be safely positioned, for example airbags which are used for protection of the thorax and pelvis and/or protection of the head and thorax and/or protection of the head, thorax and pelvis.

According to an advantageous refinement of the lateral airbag device according to an embodiment, it is provided that in the seat cover there are at least two tear seam sections which are separated by a non-tearing-open seat cover section, with at least a partial region or section of the deployed airbag being secured below the non-tearing-open seat cover section. Owing to the fact that there is a "non-tearing-open" seat cover section, the airbag is secured in some sections in the interior of the seat and is therefore positioned fixedly there; the remaining airbag regions, which deploy outside the vehicle seat, are thereby "supported at the same time" and likewise positioned. Even in the event of a severe accident, the deployed airbag therefore remains in the protective position provided for the accident situation.

According to a further advantageous refinement of the lateral airbag device, it is provided that at least one supporting element is fastened to the seat cover in the region of the tear seam in such a manner that the airbag region situated in the region of the supporting element is supported and/or held by said supporting element and therefore by the seat cover. The supporting element is particularly preferably a supporting bag which is fastened to the seat cover in such a manner that that airbag region of the airbag which is assigned to it—for example is situated in the immediate vicinity thereof—deploys into the supporting bag and, during the deployment, pushes the latter outward out of the interior of the seat. The supporting element or the supporting bag can be, for example, sewn to or into the seat cover.

It is considered particularly advantageous if a "non-tearing-open" seat cover section is combined with a supporting element according to an embodiment. It is therefore considered advantageous if the tear seam of the seat cover has at least two tear seam sections separated by a "non-tearing-open" seat cover section, with at least one airbag region of the airbag being secured below the non-tearing-open seat cover section (i.e. in the interior of the seat), and with, in addition, at least one supporting element being fastened to the seat cover in such a manner that an airbag region emerging out of the interior of the seat is additionally positioned or "supported". The supporting element may be, for example, a supporting bag which is preferably arranged in the interior of the seat, so that the airbag region situated in the region of the supporting bag deploys into the supporting bag and, in the process, pushes the latter out of the interior of the seat.

According to another advantageous refinement of the lateral airbag device of an embodiment, it is provided that in the seat cover there are at least two tear seam sections, the tearing-open behavior of which differs. One of the at least two tear seam sections preferably requires a greater tearing-open force than the other tear seam section.

For example, in the seat cover there are two outer tear seam sections which are separated by an inner tear seam section situated inbetween, the tear seam section which is situated inbetween requiring a greater tearing-open force than the two outer tear seam sections. During the deployment of the airbag, the tear seam section which is situated inbetween tears open only after the two outer tear seam sections have been torn open, and initially keeps back a partial section of the airbag in the interior of the vehicle seat at least during a first phase of the deployment operation of the airbag.

The different tearing-open behavior of the tear seam sections is preferably at least also based on the fact that the stitch spacing of the tear seams differs. Alternatively or in addition, the different tearing-open behavior of the tear seam sections can at least also be based on the fact that the tear seam sections are provided with a different number of tear seams.

Embodiments also include a vehicle seat with the lateral airbag device described. With regard to the advantages of the vehicle seat according to exemplary embodiments, reference is made to the above embodiments in conjunction with the lateral airbag device, since the advantages of the vehicle seat can correspond to those of the lateral airbag device according to an embodiment.

In addition, an embodiment relates to a method for protecting a vehicle occupant, in which an airbag which is integrated in a vehicle seat is inflated in the event of an accident, with at least one tear seam being torn open, through which the airbag deploys.

In order, in the case of a method of this type, to achieve particularly reliable protection of the vehicle occupant in the event of an accident, it is provided according to the embodiment that a positioning of the deploying airbag and/or a positioning of the already deployed airbag is carried out by the seat cover of the vehicle seat. This therefore involves an active, specific influencing control on the position of the airbag with the aid of the seat cover.

FIG. 1 illustrates a vehicle seat 10 with a backrest 20 and a lower seat section 30. A lateral airbag device 40 with an airbag 50 is arranged in the region of the backrest 20. FIG. 1 shows in this case the vehicle seat 10 and the lateral airbag device 40 after an accident event has occurred, and so the airbag 50 is already deployed.

It can be seen in FIG. 1 that the airbag 50 has three interconnected airbag regions 60a, 60b and 60c. The upper airbag region 60a—for example a thorax section—and the lower airbag region 60c—for example a pelvis section—pass out of the region of the backrest 20 through openings 70a and 70b. These openings 70a and 70b are formed as soon as the airbag 50 deploys and thereby tears open along tear seams or tear seam sections 80a and 80b in the seat cover 90 of the vehicle seat 10. As soon as the tear seams in the seat cover 90 are torn open, the two airbag regions 60a and 60c emerge from the backrest.

As can be seen in FIG. 1, the two tear seam sections 80a and 80b are separated from each other by a seat cover section 100 of the seat cover 90 that does not tear open. Owing to the fact that the seat cover 90 does not tear open in the seat cover section 100, the airbag 50 cannot leave the backrest 20 in this region. The airbag 50 is therefore secured in the interior of the vehicle seat in the region of the non-tearing-open seat cover section 100, as a result of which the inner airbag region 60b is formed. The securing of the inner airbag region 60b causes a supporting action by which the completely deployed airbag 50 is fixedly positioned and supported relative to the backrest 20; the two airbag regions 60a and 60c are thereby also—at least indirectly—secured and positioned. The two airbag regions 60a and 60c can therefore ensure their protective action with respect to a vehicle occupant in an optimum manner.

FIG. 2 illustrates a further exemplary embodiment of a lateral airbag device according an embodiment and of a vehicle seat according to an embodiment. The lateral airbag device 40 according to FIG. 2 substantially corresponds to the lateral airbag device 40 according to FIG. 1. In addition, a supporting bag or "inner bag", which is fitted on, for example sewn to, the seat cover 90 of the backrest 20, is provided in the region of the lower airbag region 60c of the airbag 50. As soon as the airbag 50 is inflated by a gas generator (not illustrated specifically in FIGS. 1 and 2) in the event of a vehicle accident, the lower airbag region 60c will deploy into the supporting bag 200 and will push the latter out of the interior of the seat or the seat cover 90. The lower airbag region 60c is subsequently inflated further and will fill the supporting bag 200. The resulting final state after complete inflation of the airbag 50 is illustrated in FIG. 2.

Furthermore, instead of an arrangement of the supporting bag in the interior of the vehicle seat, an arrangement outside would also be conceivable.

A combination comprising a supporting bag 200 and a non-tearing-open seat cover section 100 has been presented above in conjunction with FIG. 2. Alternatively, it is likewise possible just to use a supporting bag 200 to support the airbag 50 and to omit a "non-tearing-open" seat cover section 100, as has been explained in conjunction with FIGS. 1 and 2.

FIG. 3 shows a third exemplary embodiment of a lateral airbag device. In this third exemplary embodiment, there are three tear seam sections 300, 310 and 320 in the seat cover 90. The two outer tear seam sections 300 and 320 have a different tearing-open behavior than the tear seam section 310 which is the inner one or is situated inbetween; in specific terms, the tear seam section 310 which is situated inbetween requires a greater tearing-open force than the two outer tear seam sections 300 and 320. In order to achieve a greater tearing-open force for the tear seam section 310 which is situated inbetween, the latter is provided, for example, with a smaller stitch spacing and therefore with a greater stitch density than the two outer tear seam sections 300 and 320. Alternatively or in addition, the tear seam section 310 which is situated inbetween is provided with a greater number of tear seams than the two outer tear seam sections 300 and 320.

Figure 4:
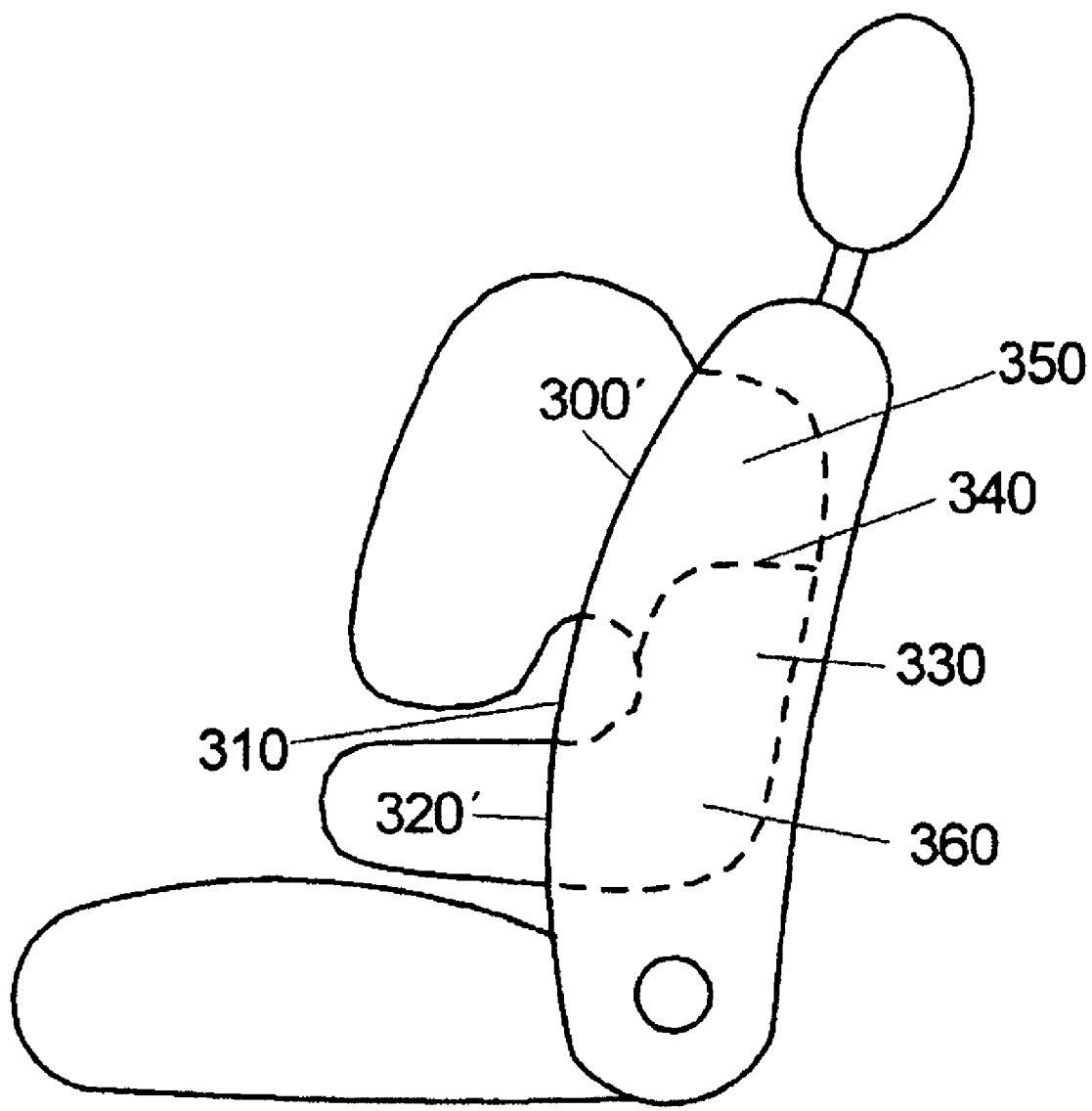
FIG. 4 illustrates a lateral airbag device in which a separating section is shown.

On account of the greater tearing-open force required in the tear seam section 310 which is situated inbetween, during the deployment of the airbag 50 only the two outer tear seam sections 300 and 320 tear open, with the result that the airbag can initially deploy exclusively through openings 300' and 320'. A partial section 330 of the airbag 50 is therefore initially kept back in the interior of the vehicle seat during a first phase of the deployment operation of the airbag; FIG. 4 shows this in detail.

Figure 5:
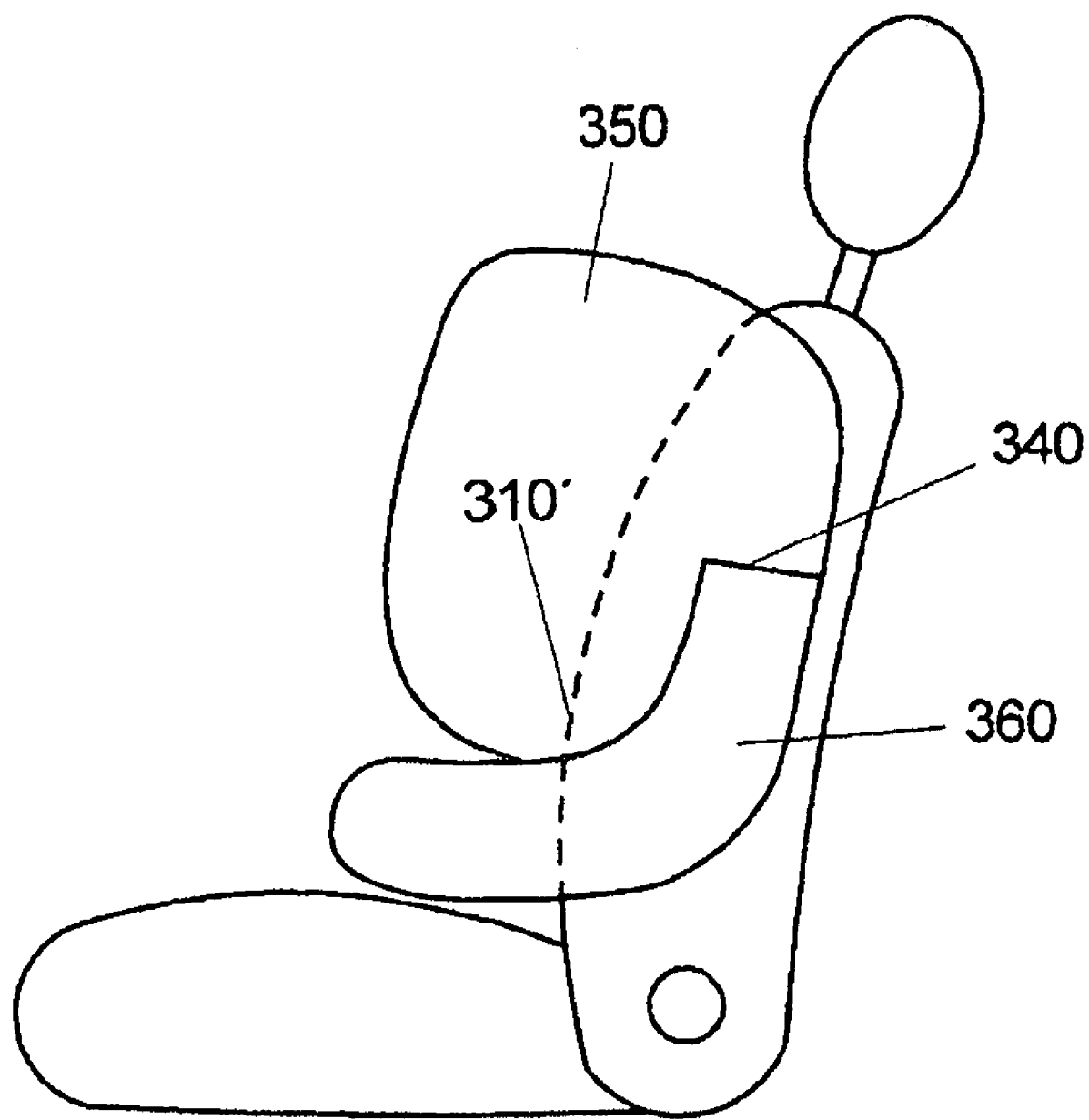
FIG. 5 illustrates a lateral airbag device in which a tear seam section after opening is shown.

Owing to this partial section 330 being kept back, the deployment operation of the airbag 50 is controlled, so that the latter—given an appropriate configuration of the tear seam sections 300 to 320—is brought into the desired position. Only after this first positioning phase is finished does the tear seam section 310 which is situated inbetween tear open, thus producing a further opening 310' which connects the two outer openings 300' and 320'; in this case, the tear seam section 310 which is situated in between only tears open after the stable position of the airbag 50 is secured (shown in FIG. 5).

After the tear seam section 310 which is situated inbetween is opened, the further opening 310' makes it possible for the airbag 50 to build up its maximum effective thickness and to make its maximum protective potential available.

FIG. 4 also shows a separating section 340 which divides the airbag 50 into an upper airbag chamber 350 and into a lower airbag chamber 360. This separating section 340 can be of gastight or gas-permeable design. Furthermore, there can also be a corresponding separating section between the upper airbag chamber and the lower airbag chamber in the first and the second exemplary embodiment according to FIGS. 1 and 2.

The Germany Priority Application 10 2004 040 236.1, filed Aug. 13, 2004, including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A lateral airbag device, comprising:
an airbag mounted in a vehicle seat below a seat cover of the vehicle seat, the airbag being inflated in an event of a vehicle accident;
wherein the seat cover includes at least two tear seam sections which are separated by a non-tearing-open seat cover section, the at least two tear seam sections are torn open by the deploying airbag and permit the airbag to emerge from the vehicle seat, wherein the deploying airbag deploys into a predetermined position by a configuration of the seat cover, or the seat cover maintains a predetermined position of the airbag; and
at least one supporting element fastened to the seat cover in a region of the tear seam in such a manner that an airbag region tearing open the tear seam is supported by the supporting element,
wherein the supporting element is formed by a supporting bag, the supporting bag being fastened to the seat cover in the region of the tear seam in such a manner that an airbag region of the airbag which is assigned to the supporting bag deploys into the supporting bag and pushes the supporting bag outward out of an interior of the seat.

2. The lateral airbag device as claimed in claim 1, wherein at least a partial section of the airbag is kept back in an interior of the vehicle seat by the non-tearing-open seat cover section.

3. The lateral airbag device as claimed in claim 1, wherein the supporting element is sewn to the seat cover.

4. A vehicle seat, comprising:
a lateral airbag device that includes an airbag mounted in a vehicle seat below a seat cover of the vehicle seat, the airbag being inflated in an event of a vehicle accident,
wherein the seat cover includes at least two tear seam sections which are separated by a non-tearing-open seat cover section, the at least two tear seam sections are torn open by the deploying airbag and permit the airbag to emerge from the vehicle seat, and
wherein the deploying airbag deploys into a predetermined position by a configuration of the seat cover, or the seat cover maintains a predetermined position of the airbag,
at least one supporting element fastened to the seat cover in a region of one of the tear seam sections in such a manner that an airbag region tearing open the one tear seam section is supported by the supporting element, and
wherein the supporting element is formed by a supporting bag, the supporting bag being fastened to the seat cover in the region of the tear seam in such a manner that an airbag region of the airbag which is assigned to the supporting bag deploys into the supporting bag and pushes the supporting bag outward out of an interior of the seat.

5. A method for protecting a vehicle occupant, comprising:
positioning an airbag in a vehicle seat such that the airbag is inflated in an event of an accident; and
tearing open at least two tear seam sections in a seat cover of the vehicle seat which are separated by a non-tearing-open seat cover section such that the airbag deploys through openings from the opened tear seam sections,
wherein a position of the deploying or of the deployed airbag is determined by the seat cover,
wherein the positioning is carried out by a supporting element fastened to the seat cover in a region of the tear seam by an airbag region tearing open the tear seam being supported by said supporting element, and
wherein the supporting element includes a supporting bag fastened to the seat cover in the region of the tear seam in such a manner that an airbag region of the airbag which is situated in a region of the supporting bag deploys into the supporting bag and pushes the supporting bag outward out of an interior of the seat.

6. The method as claimed in claim 5, wherein the airbag is supported by the seat cover.

7. The method as claimed in claim 5, wherein at least one partial section of the airbag being kept back in an interior of the vehicle seat by the non-tearing-open seat cover section.

8. The method as claimed in claim 5, wherein the supporting element is sewn to the seat cover.

* * * * *